United States Patent
Fernandes et al.

(10) Patent No.: US 10,618,022 B2
(45) Date of Patent: Apr. 14, 2020

(54) INCLINED BED REACTOR PERMITTING A SMALL QUANTITY OF CATALYST TO BE EMPLOYED

(71) Applicant: IFP Energies nouvelles, Rueil-Malmaison (FR)

(72) Inventors: Joana Fernandes, Solaize (FR); Julien Gornay, Les Cotes d Arey (FR); Alexandre Pagot, St Genis Laval (FR); Fabian Lambert, Chatou (FR); Pierre-Yves Martin, Rueil Malmaison (FR); Christophe Pierre, Carrieres sur Seine (FR); Francois Sala, Paris (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 107 days.

(21) Appl. No.: 15/555,260

(22) PCT Filed: Mar. 2, 2016

(86) PCT No.: PCT/EP2016/054428
§ 371 (c)(1),
(2) Date: Sep. 1, 2017

(87) PCT Pub. No.: WO2016/139247
PCT Pub. Date: Sep. 9, 2016

(65) Prior Publication Data
US 2018/0036701 A1    Feb. 8, 2018

(30) Foreign Application Priority Data
Mar. 4, 2015 (FR) .................... 15 51821

(51) Int. Cl.
*B01J 8/12* (2006.01)
*C10G 35/04* (2006.01)

(52) U.S. Cl.
CPC ............ *B01J 8/12* (2013.01); *B01J 2219/185* (2013.01); *B01J 2219/1946* (2013.01); *C10G 35/04* (2013.01)

(58) Field of Classification Search
CPC ................... B01J 8/12; B01J 2219/185; B01J 2219/1946; C10G 35/04
(Continued)

(56) References Cited

U.S. PATENT DOCUMENTS 4,135,886 A * 1/1979 Kuchar ................. C10G 35/12
                                                               208/165
6,221,320 B1   4/2001 Nagaoka
(Continued)

FOREIGN PATENT DOCUMENTS

GB   1165688 A   10/1969
GB   2155349 A   9/1985
(Continued)

OTHER PUBLICATIONS

International Search Report PCT/EP2016/054428 dated Apr. 3, 2016.
(Continued)

*Primary Examiner* — Huy Tram Nguyen
(74) *Attorney, Agent, or Firm* — Millen, White, Zelano and Branigan, P.C.

(57) ABSTRACT

The present invention describes a type of inclined bed reactor which permits a small quantity of catalyst to be employed. Application of the reactor to a regenerative reforming process.

12 Claims, 2 Drawing Sheets

(58) Field of Classification Search
USPC .......................................................... 422/211
See application file for complete search history.

(56) References Cited

U.S. PATENT DOCUMENTS

| | | | | |
|---|---|---|---|---|
| 7,070,742 B2* | 7/2006 | Lenglet | .................... | B01J 8/003 |
| | | | | 422/139 |
| 9,050,569 B2* | 6/2015 | Douziech | ................ | B01J 8/009 |

FOREIGN PATENT DOCUMENTS

| | | | | | |
|---|---|---|---|---|---|
| JP | 56144736 | A | 11/1981 | | |
| OA | 3439 | A | 3/1971 | | |
| WO | WO-2014146129 | A2 * | 9/2014 | ............... | C10G 7/06 |
| WO | 2016139247 | A1 | 9/2016 | | |

OTHER PUBLICATIONS

English translation of JP56144736A issued Nov. 11, 1981 to Fukazawa Haruo Babcock of Hitachi KK.
English translation of WO2016139247A1 issued Sep. 9, 2016.

* cited by examiner

INCLINED BED REACTOR PERMITTING A SMALL QUANTITY OF CATALYST TO BE EMPLOYED

FIELD OF THE INVENTION

The invention relates to a novel inclined bed reactor technology with gravitational movement of the catalyst and transverse flow of the feed. More particularly, it is applicable to the catalytic reforming of gasolines with continuous regeneration of catalyst. The invention means that very small quantities of catalyst can be used, and thus the residence times can be kept low—a feature which cannot be obtained with current technologies.

The present reactor can be used to obtain HSVs of more than 50 $h^{-1}$ (ratio of the flow rate of the feed to the mass of catalyst), or even more than 100 $h^{-1}$.

In the context of reactions with a high endo- or exothermicity such as gasoline reforming reactions, for example, the reactor of the invention can be used to limit the impact of this thermicity on the temperature profile inside the reaction zone. Given the impact of a variation in temperature inside the reactor on catalytic activity, this means that it has a fundamental effect on the performance of the unit.

The present technology may be considered to be an extension of the radial bed technology used in regenerative reforming.

EXAMINATION OF THE PRIOR ART

In the prior art concerning radial bed reactors, the U.S. Pat. No. 6,221,320, which provides a summary of conventional technologies, may be cited.

In the prior art, the catalytic bed in a radial bed reactor is delimited by two grids, an inner grid and an outer grid. More precisely, the following can generally be discerned:

an inner grid which delimits the central collector for the gaseous effluents,
an outer grid which delimits the supply volume for the feed in the gaseous state.

The process fluid arrives via the outer volume defined between the outer shell and the outer grid. It then passes through the catalytic bed in a substantially horizontal manner perpendicular to the movement of catalyst which is gravitational, i.e. substantially vertical from top to bottom and obtained solely by the effect of the weight of the bed of catalyst.

The radial flow of the process fluid and the gravitational flow of the catalyst are separated via the inner grid which is generally cylindrical in shape and has the same substantially vertical axis as the outer grid.

The cylinder, or more generally the substantially cylindrical shape defined by the inner grid, acts as a central collector to evacuate the gaseous effluents from the reaction zone included between the outer grid and the inner grid; thus, the reaction zone is substantially annular in shape.

Many constraints are linked to radial bed technology. In particular, the velocities of the gas passing through the catalytic bed are limited in order to:

avoid cavitation at the inlet to the bed,
prevent the catalyst from becoming pinned against the inner grid as it leaves.
reduce the pressure drops, which are a function of the velocity and thickness of the bed.

For the purposes of homogeneous distribution over the entire height of the catalytic bed, a perforated grid which is intended to create a pressure drop may be added to the central collector.

Finally, for the purposes of construction, it is often necessary to leave a sufficient space between the inner grid and the outer grid. In total, the cumulative constraints mean that the minimum volume of catalyst which can be enclosed in the annular zone cannot drop below a certain minimum value.

In general in the prior art, the maximum HSVs are of the order of 20 $h^{-1}$, while the reactor in accordance with the present invention can be used to obtain HSVs of more than 50 $h^{-1}$ or even more than 100 $h^{-1}$.

BRIEF DESCRIPTION OF THE INVENTION

Figure 1C:
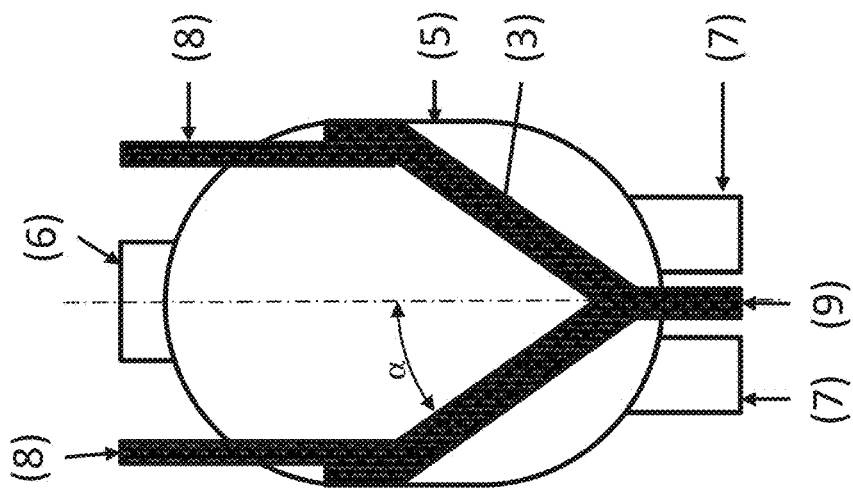
FIG. 1c represents another variation of a reactor in accordance with the invention, with peripheral introduction of catalyst and central evacuation. The catalytic bed is also delimited by two concentric cones on order to control its thickness.

The present invention may be defined as a reactor with an inclined gravitational flow of catalyst and with a transverse flow of the feed.

The term "inclined gravitational flow of catalyst" means that it does not flow vertically as in prior art reactors, but at a certain angle of inclination, the only constraint on this angle being that it must be greater than the angle known as the "angle of repose", below which a flow of solid is impossible.

The term "transverse flow of the feed" means that the feed passes through the catalytic bed in a direction which is substantially perpendicular to that of the flow of catalyst.

Said reactor is constituted by an outer conical wall 1 and an inner conical wall 2, the two walls being substantially parallel to each other, i.e. the distance separating the two walls and defining the thickness of the inclined catalytic zone 3 does not vary by more than 1 cm between the upper portion and the lower portion of said catalytic zone.

The point of the cone formed by the outer and inner walls may be directed towards the top or towards the bottom.

The inclined catalytic zone 3 is generally preceded by a catalyst distribution zone 4 which is a vertical cylindrical zone with height H in the range 200 to 1500 mm, preferably in the range 350 to 700 mm, the catalyst being introduced into said distribution zone 4 via one or more introduction legs 8 and collected from the outlet from the inclined catalytic zone 3 by one or more evacuation legs 9.

Figure 1B:
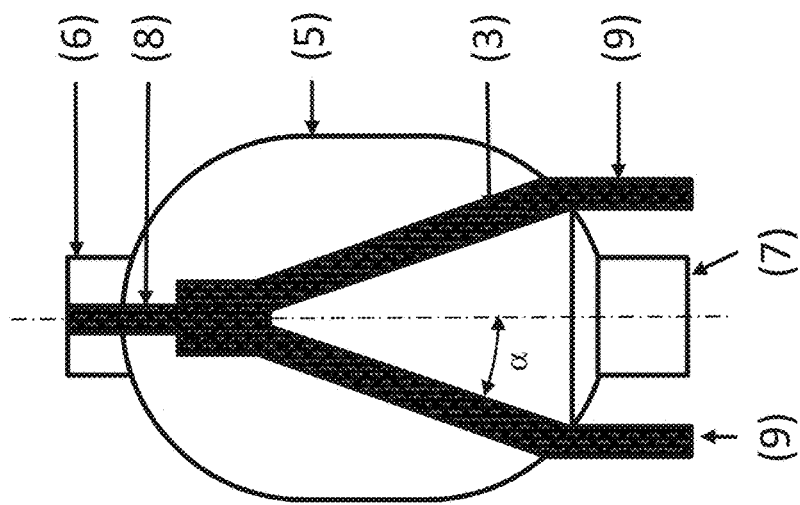
FIG. 1b represents a diagrammatic view of a reactor in accordance with the invention with another angle of inclination for the catalytic zone and a catalytic bed delimited by two concentric cones in order to control its thickness.
Figure 1A:
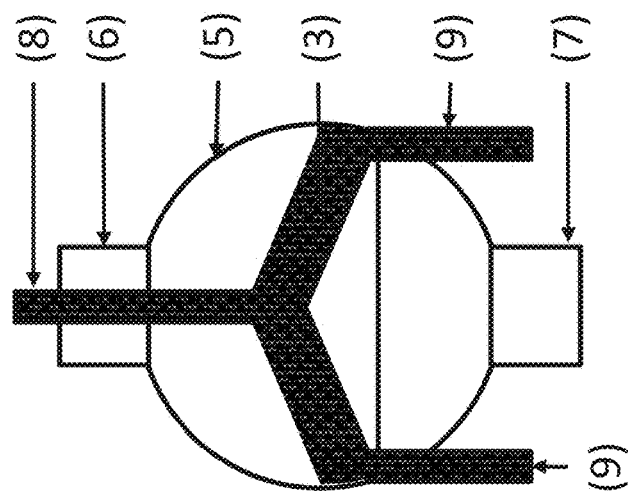
FIG. 1a represents a diagrammatic view of a reactor in accordance with the invention with central introduction of the catalyst and lateral evacuation. The angle of the bed with respect to the horizontal is greater than the angle of repose of the catalyst (minimum angle ensuring gravitational flow of the particles of catalyst)

A reactor with the inclined catalytic zone 3 and in which the catalyst is introduced via one introduction leg and collected via a plurality of evacuation legs as represented in FIGS. 1a and 1b falls entirely within the scope of the present invention. The remainder of the description concerns a reactor such as that represented by FIG. 1c.

The assembly constituted by the outer 1 and inner 2 conical walls, the introduction legs 8, and the evacuation leg or legs 9 is enclosed in a shell 5 comprising an upper hemispherical portion 10, a central cylindrical portion 11 and a lower hemispherical portion 12. The feed is admitted into the interior of the shell 5 via an admission pipe 6 generally located at the top of the upper hemispherical portion 10, and the reaction effluents are evacuated via a lower pipe 7 generally located at the lower portion of the lower hemispherical portion 12.

In general, the distance separating the outer 1 and inner 2 conical walls is in the range 50 to 200 mm, preferably in the range 50 to 150 mm.

In general in the context of the present invention, the angle alpha of inclination of the inclined catalytic zone 3 is in the range 0° (excluded) to 70°, and preferably in the range 10° to 50°, this angle alpha being with respect to the vertical.

In general in the context of the present invention, the height-to-diameter ratio is in the range 1 to 30, preferably in the range 1 to 10, and more preferably in the range 1 to 5, the height being defined as the sum of the heights of the distribution zone 4 and the inclined catalytic zone 3, and the diameter as that of the distribution zone 4.

The present invention also concerns a process for catalytic reforming of a gasoline type cut using the reactor described above.

In accordance with this process:
the feed enters the shell 5 by means of the inlet pipe 6 located approximately at the top of the upper hemispherical portion 10 of the shell 5,
the feed passes through the inclined catalytic zone 3 and the effluents resulting from the catalytic reaction are collected in the outlet pipe 7 located approximately at the centre of the lower hemispherical portion 12 of the shell 5,
the catalyst is admitted into the vertical distribution zone 4 via the introduction leg or legs 8, flows under gravity through the inclined catalytic zone 3 and is then evacuated via the central outlet leg or legs 9.

The process for the catalytic reforming of a gasoline type cut in accordance with the invention has a HSV (ratio of the mass flow rate of feed to the weight of catalyst) which is generally more than 50 $h^{-1}$, preferably more than 100 $h^{-1}$.

The process for the catalytic reforming of a gasoline type cut in accordance with the invention may be used to treat feeds with a paraffins content which may be up to 70% by weight.

Finally, the process for the catalytic reforming of a gasoline type cut in accordance with the invention may even be used to treat an entirely paraffinic feed.

The inclined gravitational flow reactor in accordance with the present invention is preferably incorporated into a catalytic reforming unit at the head of the series of 3 or 4 reactors constituting said unit.

The typical operating conditions for a unit for the regenerative reforming of gasolines are as follows:

an inlet temperature for each reactor in the range 480° C. to 550° C.,
a pressure for each reactor in the range 0.9 to 0.5 MPa (1 MPa=$10^6$ Pa). This operating pressure generally reduces along succeeding reactors from the head reactor to the last reactor.

DETAILED DESCRIPTION OF THE INVENTION

The present invention describes a type of inclined catalytic bed reactor intended to employ a small quantity of catalyst, of the order of one tonne, and which can advantageously constitute the first reactor of the series in a unit for the catalytic reforming of gasolines which, in the prior art, comprises three to four reactors placed in series.

More precisely, the reactor in accordance with the present invention is a reactor with an inclined gravitational flow of catalyst and with a transverse flow of the feed. The term "inclined gravitational flow of catalyst" means a flow which occurs under the force of gravity and at a certain angle alpha in the range 0° to 70° (this angle alpha is with respect to the vertical).

The reactor in accordance with the present invention comprises an outer conical wall 1 and an inner conical wall 2, the two walls being substantially parallel to each other. The term "substantially parallel" means that the distance "e" (see FIG. 2a) separating the two walls and defining the thickness of the catalytic layer does not vary by more than 1 cm between the upper portion and the lower portion of the reactor.

The point of the cone formed by the outer 1 and inner 2 walls may be directed towards the top or towards the bottom.

Preferably, when the point is directed towards the bottom (corresponding to FIG. 1c), a plurality of introduction legs 8 and one catalyst evacuation leg 9 are used.

In the same manner, when the point of the cone formed by the outer 1 and inner 2 walls is directed towards the top (corresponding to FIGS. 1a and 1b), one catalyst introduction leg 8 and a plurality of evacuation legs 9 are preferably employed.

Figure 2B:
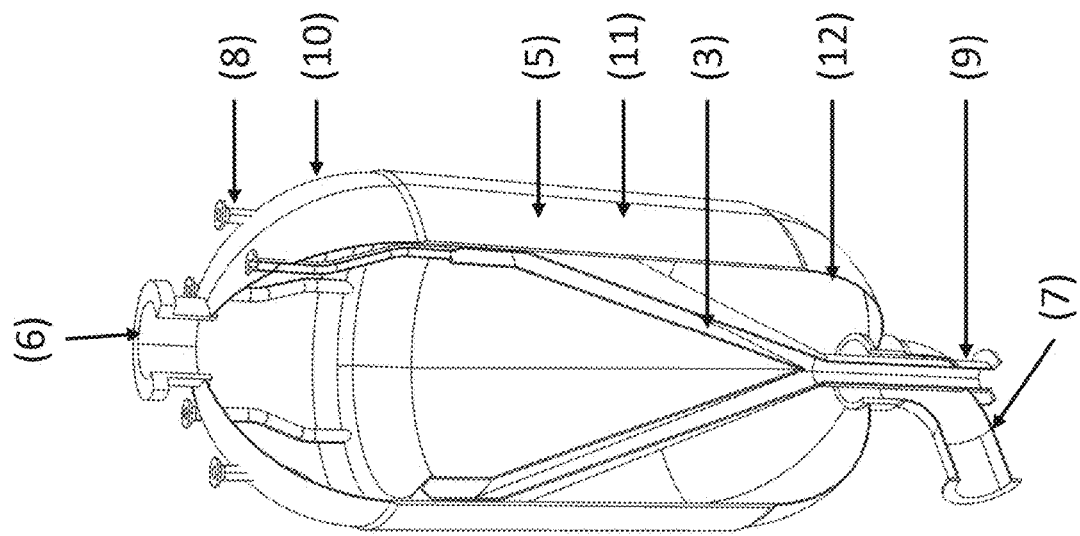
FIG. 2b represents the same exploded view as that of FIG. 2a, the reactor being provided with its outer envelope 5, which means that reaction gas can be introduced via the inlet pipe 6 and effluents can be recovered from the outlet pipe 7. The catalytic bed is traversed solely along the inclined portion, the inclined catalytic zone 3.
Figure 2A:
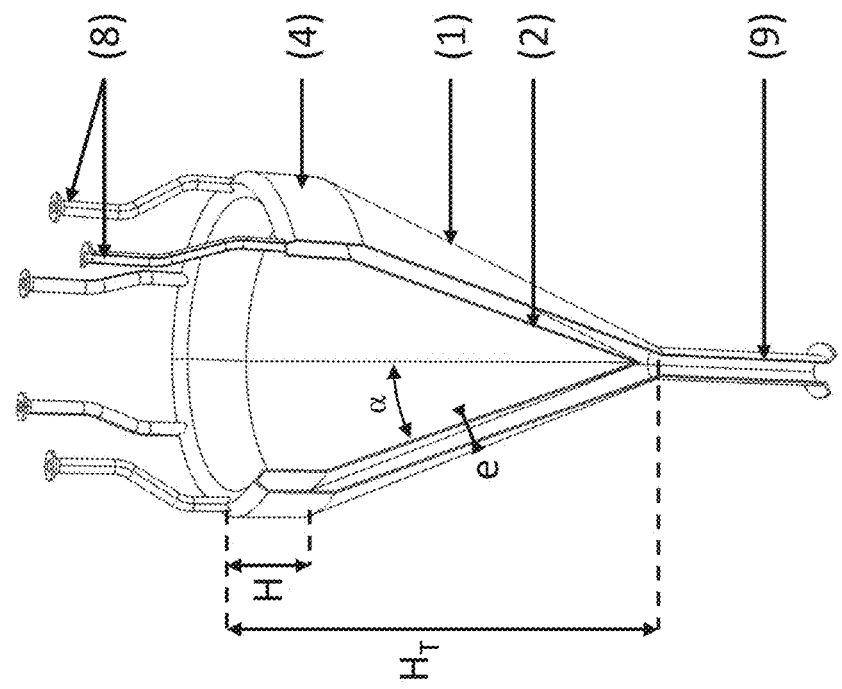
FIG. 2a represents an exploded view of the reactor of the invention in the variation of FIG. 1c, which allows the peripheral introduction legs 8 for the catalyst and the central collector leg 9 to be viewed.

The remainder of the description refers to the configuration of a catalytic zone 3 with conical walls directed towards the bottom (see FIG. 1c, detailed in FIGS. 2a and 2b).

The inclined catalytic zone 3 is generally preceded by a catalyst distribution zone 4, which is a vertical zone with height H in the range 200 to 1500 mm, preferably in the range 350 to 700 mm.

This distribution zone means that the catalyst introduced via the introduction legs 8 can be distributed uniformly before it enters the inclined catalytic zone 3.

These introduction legs 8 have a diameter which is generally in the range 2 to 4 inches (i.e. between 5.0 cm and 10.2 cm).

The inclined catalytic zone 3 terminates in a catalyst evacuation pipe 9, which is also known as the central evacuation leg 9, which has a diameter which is generally in the range 2 to 6 inches (i.e. between 5.0 cm and 7.7 cm). In certain cases, several evacuation legs 9 may be provided, distributed substantially uniformly in a circle. In the remainder of the description, for the purposes of simplification, a single evacuation leg only shall be referred to.

In the introduction legs 8, the catalyst distribution zone 4, the inclined catalytic zone 3 and the central evacuation leg 9, the flow of catalyst is always gravitational.

The assembly formed by the introduction legs 8, the catalyst introduction zone 4, the inclined catalytic zone 3 and the central evacuation leg 9 is enclosed in a shell 5 comprising an upper hemispherical portion 10, a central cylindrical portion 11 and a lower hemispherical portion 12.

The feed is introduced into the top of the upper hemispherical portion via the inlet pipe 6. The feed passes through the inclined catalytic zone 3 over the whole of the inclined portion and the reaction effluents are collected via the outlet pipe 7 located in the lower hemispherical portion of the shell 5.

The thickness of the inclined catalytic zone 3 is in the range 50 to 200 mm, preferably in the range 50 mm to 150 mm.

The angle of inclination alpha of the inclined catalytic zone 3 is in the range 0° to 70°, and preferably in the range 10° to 50°.

Of the possible dispositions of the reactor of the invention, it is possible to have a central introduction of catalyst and a peripheral evacuation, as represented in FIGS. 1a and 1b.

The unvarying element in these various dispositions is the existence of the inclined catalytic zone 3.

This means that a disposition of the reactor as represented in FIG. 1a or 1b in which the catalyst is admitted via one upper introduction leg 8 and collected via a plurality of lower collection legs 9 falls entirely within the scope of the present invention.

The catalyst distribution zone 4 has a height H which depends on the number of introduction legs 8, the angle of flow of the catalyst and the diameter of the shell. This height is generally in the range 200 to 1500 mm, preferably between 350 and 700 mm.

Advantageously, the reactor of the present invention may be used as the head reactor in a process for the catalytic reforming of a gasoline type cut using a series of three or four radial bed reactors. In this case, the flow of the feed and of the catalyst may be described as follows:
the feed enters the shell 1 by means of the inlet pipe 6 located approximately at the top of the upper hemispherical portion 10 of the shell 5,
the feed passes through the inclined catalytic zone 3 and the effluents resulting from the catalytic reaction are collected in the outlet pipe 7 located approximately at the centre of the lower hemispherical portion 12 of the shell 5,
the catalyst is admitted into the vertical distribution zone 4 via the introduction legs 8, flows under gravity through the inclined catalytic zone 3 and is then evacuated via the central outlet leg or legs 9. This catalyst is generally in the form of spherical beads with a diameter in the range 1 to 4 mm, preferably in the range 1.5 to 2 mm.

In a process for the catalytic reforming of a gasoline type cut using the reactor in accordance with the present invention, the HSV (ratio of the flow rate of feed to the weight of catalyst) is more than 50 $h^{-1}$, preferably more than 100 $h^{-1}$.

In a process for the catalytic reforming of a gasoline type cut using the reactor in accordance with the present invention, the feed may have a paraffins content which may be up to 70% by weight, and may even be an entirely paraffinic feed.

EXAMPLES

The following examples serve to illustrate the dimensions of a reactor in accordance with the invention intended to be placed at the head of a regenerative reforming unit treating a feed which was a gasoline cut with a flow rate of 150 t/h of feed. As is usually the case, the term "gasoline cut" means an oil cut with an initial boiling point of approximately 40° C. and with an end point of approximately 220° C. Any oil cut within these limits may be entirely suitable as a feed for regenerative reforming.

Example 1 represents a reference case, not in accordance with the invention,
Example 2 illustrates the performances of a unit provided with a head reactor in accordance with the invention with the same operating conditions and the same total quantity of catalyst as in Example 1,
Example 3 illustrates the performances of a unit having the same characteristics as that of Example 2, but treating a more severe feed.

Example 1, in Accordance with the Prior Art

In this example, a feed of hydrocarbons was treated in four reaction zones (or reactors) disposed in series. The distribution of the catalyst in the reactors was as follows: 10%/20%/30%/40% by weight with respect to the total weight of catalyst.

The ordering of the reactors corresponded to the flow of effluents.

The total quantity of catalyst was 75 tonnes. The overall HSV was 2 $h^{-1}$.

Table 1 provides the composition of the hydrocarbon feed:
initial boiling point 100° C., final boiling point 170° C.:

TABLE 1

| Composition of feed (% by weight) | Paraffins | 50 |
|---|---|---|
| | Olefins | 0 |
| | Naphthenes | 35 |
| | Aromatics | 15 |
| | RON | 48.4 |
| | Flow rate (t/h) | 150 |

The catalyst used in the reactors comprised a chlorinated alumina type support, platinum and was promoted with tin. The catalyst particles were spherical with a mean diameter of 1.8 mm.

The feed, heated to 520° C., was then treated in succession in the four reactors with intermediate heating of the effluent to 520° C. before it was introduced into the next reaction zone.

The operating conditions in the four reaction zones are given in Table 2 below. These conditions were selected in order to produce a reformate recovered from the outlet from the fourth reactor which had a RON (Research Octane Number) equal to 103.5.

TABLE 2

| | Reactor 1 | Reactor 2 | Reactor 3 | Reactor 4 |
|---|---|---|---|---|
| Temperature at reactor inlet (° C.) | 520 | 520 | 520 | 520 |
| Pressure (MPa) | 0.69 | 0.65 | 0.60 | 0.55 |
| HSV ($h^{-1}$) | 20.0 | 10.0 | 6.7 | 5.0 |
| H$_2$/feed molar ratio (mol/mol) | 2.5 | — | — | — |

Example 2 is in accordance with the invention. The hydrocarbon feed was treated in five reactors disposed in series with the following distribution of catalyst: 2%/10%/20%/30%/38% by weight with respect to the total catalyst weight.

The small reactor in accordance with the present invention was placed at the head. This was reactor 1, which contained 2% of the total mass of catalyst in the unit.

The total quantity of catalyst was still 75 tonnes in order to treat a flow rate of hydrocarbon feed of 150 t/h (overall HSV=2 h$^{-1}$).

As was the case for Example 1, the feed and the effluent from one reaction zone were heated to 520° C. before entering the next reaction zone.

The operating conditions in the reaction zones of the reactors are summarized in Table 3 below:

TABLE 3

|  | Reactor 1 | Reactor 2 | Reactor 3 | Reactor 4 | Reactor 5 |
|---|---|---|---|---|---|
| Temperature at reactor inlet (° C.) | 520 | 520 | 520 | 520 | 520 |
| Pressure (MPa) | 0.74 | 0.69 | 0.65 | 0.60 | 0.55 |
| HSV (h$^{-1}$) | 100.0 | 20.0 | 10.0 | 6.7 | 5.26 |
| H$_2$/feed molar ratio (mol/mol) | 2.5 | — | — | — | — |

The dimensions of the first reactor were in agreement with FIGS. 2a and 2b with the geometric characteristics described in Table 4 below.

TABLE 4

| HSV | (h$^{-1}$) | 100 |
|---|---|---|
| Catalyst volume | (m$^3$) | 1.74 |
| Cone angle, alpha (/vertical) | (°) | 20 |
| Thickness of catalytic bed | (mm) | 150 |
| Shell diameter | (m) | 2.43 |
| Height of catalyst distribution zone (H) | (m) | 0.5 |
| Total height of catalyst H$_T$ | (m) | 3.4 |
| Total height of reactor | (m) | 5.2 |
| Pressure drop in annular reaction zones | (Pa) | 600 |

By employing the small head reactor in accordance with the invention, the drop in temperature in the first reaction zone was limited, as well as in the other zones 2, 3, 4 and 5. In fact, the very high endothermicity linked to the first reactions was controlled more easily by employing a very small quantity of catalyst.

Given that the activity of the catalyst is a function of the mean temperature in the catalytic bed, by limiting the drop in temperature inside the reactor, the yield of aromatic compounds was improved, as indicated in Table 5 below.

TABLE 5

|  | Example 1 (not in accordance with the invention) | Example 2 (in accordance with the invention) |
|---|---|---|
| Overall HSV (h$^{-1}$) | 2 | 2 |
| HSV (h$^{-1}$) of head reactor | 20 | 100 |
| Yield of reformate (C5+) (% by weight) | 91.2 | 90.4 |
| Yield of aromatics (% by weight) | 74.6 | 75.8 |
| RON of reformate | 103.5 | 104.7 |

This increase in temperature in the catalytic beds has a large impact on the activity of the catalyst. For the same quantity of catalyst as illustrated below, the increase in aromatics production produced a RON improvement of 1.2 points.

Example 3 illustrates the advantage of the invention as regards the severity of the feed.

A feed becomes more severe as its paraffins content is increased.

In accordance with the prior art approach, it is necessary to increase the quantity of catalyst or the reactor inlet temperature in order to maintain the RON of the reformate.

Example 3 treated a feed described in Table 6 below, which feed was much more severe than that of Example 1, since it was very distinctly paraffinic.

TABLE 6

| Composition of feed (% by weight) | Paraffins | 63 |
|---|---|---|
|  | Olefins | 0 |
|  | Naphthenes | 22 |
|  | Aromatics | 15 |
|  | RON | 40.1 |
|  | Flow rate (t/h) | 150 |

Using the same operating conditions as those described in Tables 3 and 4, the RON of the reformate was maintained at 103.5 despite an increase of 13% by weight of the quantity of paraffins in the feed, as shown in Table 7 below. "PNA" corresponds to the percentage of paraffins (P), naphthenes (N) and aromatics (A).

TABLE 7

|  | Example 1 (not in accordance with the invention) | Example 3 (in accordance with the invention) |
|---|---|---|
| PNA of feed (% by weight) | 50/35/15 | 63/22/15 |
| Overall HSV (h$^{-1}$) | 2 | 2 |
| HSV (h$^{-1}$) of head reactor | 20 | 100 |
| RON of reformate | 103.5 | 103.5 |

Placing the reactor of the present invention at the head of the series of reactors of a catalytic gasoline reforming unit thus means that the treatment of gasoline cuts can be extended to highly paraffinic cuts, which is a very substantial improvement in a context marked by the drastic limitation of the aromatics content of gasolines.

The invention claimed is:

1. A reactor with an inclined gravitational flow of catalyst and with a transverse flow of feed, said reactor by comprising an outer conical wall (1) and an inner conical wall (2) substantially parallel to each other, the two conical walls being inclined at an angle alpha with respect to the vertical, the point of the cone optionally being directed towards the top or towards the bottom, and the catalyst being introduced into a distribution zone (4) via one or more introduction legs (8) and collected from the outlet of an inclined catalytic zone (3) via one or more evacuation legs (9), the outer (1) and inner (2) conical walls, the introduction legs (8), and the evacuation legs (9) being enclosed in a shell (5) comprising an upper hemispherical portion (10), a central cylindrical portion (11) and a lower hemispherical portion (12) and the feed being admitted into the interior of the shell (5) via an inlet pipe (6) located at the top of the upper hemispherical portion (10), and reaction effluents being evacuated via a lower pipe (7) located at the lower portion of the lower hemispherical portion (12).

2. The inclined gravitational flow reactor according to claim 1, in which the distance separating the outer (1) and inner (2) conical walls is 50 to 200 mm.

3. The inclined gravitational flow reactor according to claim 1, in which the angle alpha of inclination of the inclined catalytic reaction zone (3) is in the range 0° (excluded) to 70°, this angle alpha being with respect to the vertical.

4. The inclined gravitational flow reactor according to claim 1, in which the height-to-diameter ratio is in the range 1 to 30, the height being defined as the sum of the heights of the distribution zone (4) and the inclined catalytic zone (3), and the diameter as that of the distribution zone (4).

5. The inclined gravitational flow reactor according to claim 1, in which the distance separating the two conical walls defining the thickness of the inclined catalytic zone (3) does not vary by more than 1 cm between the upper portion and the lower portion of said catalytic zone.

6. The inclined gravitational flow reactor according to claim 1, in which the catalyst distribution zone (4) is a vertical cylindrical zone with height H in the range 200 to 1500 mm.

7. A process for the catalytic reforming of a gasoline type cut using the reactor according to claim 1, in which:
- the feed enters the shell (5) by means of the inlet pipe (6) located approximately at the top of the upper hemispherical portion of the shell (5),
- the feed passes through the inclined catalytic zone (3) and the effluents resulting from the catalytic reaction are collected in the lower pipe (7) located approximately at the center of the lower hemispherical portion of the shell (5),
- the catalyst is admitted into the distribution zone (4) via the introduction legs (8), flows under gravity through the inclined catalytic zone (3) and is then evacuated via the central outlet leg or legs (9).

8. The process for the catalytic reforming of a gasoline type cut according to claim 7, in which the HSV (ratio of the mass flow rate of feed to the weight of catalyst) is more than 50 $h^{-1}$.

9. The process for the catalytic reforming of a gasoline type cut according to claim 7, in which the feed has a paraffins content of up to 70% by weight.

10. The process for the catalytic reforming of a gasoline type cut according to claim 7, in which the feed is entirely paraffinic.

11. The process for the catalytic reforming of a gasoline type cut according to claim 7, conducted at operating conditions as follows:
- an inlet temperature for each reactor in the range 480° C. to 550° C.,
- a pressure for each reactor in the range 0.9 to 0.5 MPa (1 MPa=$10^6$ Pa).

12. The process for the catalytic reforming of a gasoline type cut, in which a reactor is placed at the head of the a series of reactors in which catalytic reforming occurs, said reactor placed at the head of the series having a inclined gravitational flow of catalyst and with a transverse flow of feed, said reactor being constituted by an outer conical wall (1) and an inner conical wall (2) substantially parallel to each other, the two conical walls being inclined at an angle alpha with respect to the vertical, the point of the cone possibly being directed towards the top or towards the bottom, and the catalyst being introduced into the distribution zone (4) via one or more introduction legs (8) and collected from the outlet of the inclined catalytic zone (3) via one or more evacuation legs (9), the outer (1) and inner (2) conical walls, the introduction legs (8), and the evacuation legs (9) is enclosed in a shell (5) comprising an upper hemispherical portion (10), a central cylindrical portion (11) and a lower hemispherical portion (12) and the feed being admitted into the interior of the shell (5) via an admission inlet pipe (6) located at the top of the upper hemispherical portion (10), and the reaction effluents being evacuated via a lower pipe (7) located at the lower portion of the lower hemispherical portion (12).

* * * * *